Patented June 20, 1950

2,512,551

UNITED STATES PATENT OFFICE 2,512,551

METHOD FOR THE RECOVERY OF 7-SUBSTITUTED-4-HYDROXYQUINOLINES

Charles C. Price and Robert H. Reitsema, Urbana, Ill., assignors, by mesne assignments, to the United States of America as represented by the Secretary of War No Drawing. Application June 4, 1945, Serial No. 597,585

1 Claim. (Cl. 260—289)

The present invention relates to the preparation of certain quinoline compounds, and more particularly, to a new and improved method of synthesizing quinoline compounds having an hydroxyl group in the 4-position of the quinoline nucleus.

4-hydroxyquinoline compounds particularly of the type (I) having at least one substituent (X) in the carbocyclic ring of the quinoline nucleus,

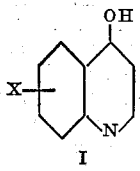

I constitute an important class of intermediates used in the preparation of numerous industrial and pharmaceutical products. Heretofore intermediates of this general type (I) have been prepared by condensing a nuclear substituted aniline, for example m-chloraniline (II), with oxaloacetic ester (III), to form the corresponding anil (IV) and then cyclizing the anil to produce a nuclear substituted 4-hydroxyquinoline-2-carboxylic acid ester (V). The resulting ester was then converted to the corresponding free acid (VI) and the acid decarboxylated to produce a substituted quinoline compound (VII) of the general type (I).

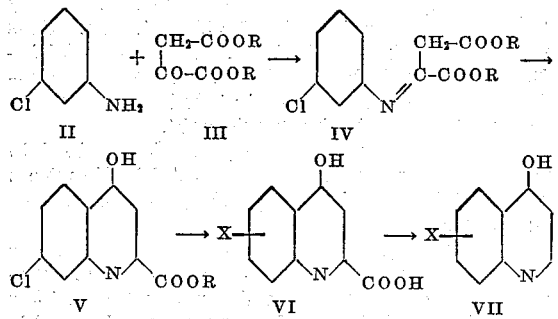

Although the foregoing preparative method is perhaps as satisfactory as any other process heretofore available for the synthesis of compounds of this general type (I), the process in question is nevertheless subject to several serious limitations. Of these, one of the most significant arises from the fact that in addition to the cyclization reaction, two further steps are required (i. e., hydrolysis and decarboxylation), before the desired compound (V) is obtained. At least one of these steps (decarboxylation) is generally difficult to carry out and the yields are often undesirably low. For this and other reasons, the synthetic methods heretofore available for the preparation of compounds of the type (I) leave much to be desired.

Broadly speaking, the object of the present invention is to provide a new and improved synthetic method that obviates the disadvantages of the prior art processes of producing 4-hydroxyquinoline compounds.

Another object is to produce intermediates of the class described by a process involving a cyclization reaction that produces directly and in one step, a compound of the type (XI)

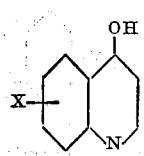

XI where X is either hydrogen or one or more monovalent nuclear substituents or radicals.

A more particular object is the provision of an improved method of producing substituted 4-hydroxyquinoline compounds suitable for use as intermediates in the synthesis of antimalarials.

A further object is the provision of a new and improved method of producing 4-hydroxyquinoline compounds having a substituent in the 7 position of the quinoline nucleus, by a process that utilizes readily available raw materials, and eliminates the necessity of converting an intermediate quinoline-carboxylic acid derivative to the free acid and then decarboxylating the resulting free acid.

Other objects and advantages will be apparent as the invention is hereinafter more particularly described.

The foregoing objects may be accomplished in accordance with the process of the present invention, which is based in part upon the discovery that, under the conditions described below, acrylic acid esters of the type (IX) where Y is either hydrogen or one or more substituents or radicals, will react, either in their acrylic ester form (IX), or in their isomeric anil form (X), to produce, directly and in one step, a 4-hydroxyquinoline compound of the type (XI).

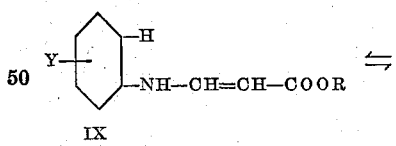

IX

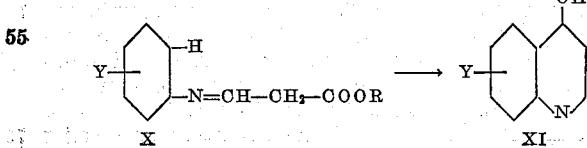

X          XI

One of the outstanding advantages of the present process is the fact that the cyclization reaction produces a compound of the type (XI), directly and in one step, without the necessity of converting an intermediate quinoline-carboxylic acid derivative to the corresponding free acid and then decarboxylating the free acid.

The substituted acrylic acid esters (IX) or their corresponding anils (X) are readily produced by various methods, for example by condensing aniline or a nuclear substituted aniline (XII) with a formylacetic acid ester (XIII), according to the scheme:

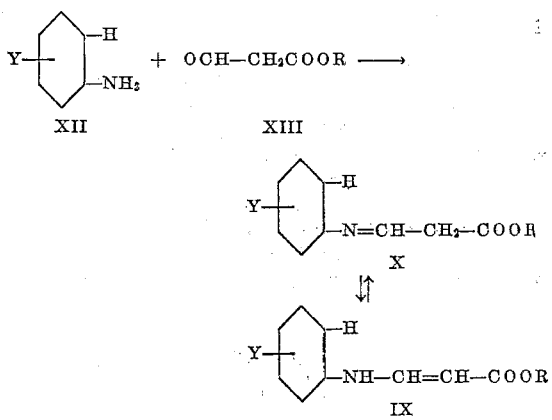

The preparation of compounds of this type (IX) is well known in the art and forms no part of the present invention. However, it may be mentioned as one of the incidental advantages of the present invention, that the raw materials of the type required in this type of reaction are generally readily available.

In accordance with the present invention, it has been found that cyclization of compounds of the type (IX) may be effected by the agency of heat alone, providing the starting material is heated while in solution in a large proportion of a neutral, preferably high boiling solvent. If the starting material (IX) is heated by itself or even in a relatively concentrated solution in a high boiling inert solvent, only tarry reaction products and bis-m-chlorophenylurea are obtained. Indeed, as a general rule, the desired cyclization may be effected only if the starting material is heated while dissolved in more than about ten to twenty times its weight of inert solvent. The solvent preferably comprises diphenyl ether, a high boiling hydrocarbon or any other inert solvent having an appropriate boiling point.

Cyclization may conveniently be effected by dissolving the starting material (IX) in 10 to 15 times its weight of solvent and slowly adding the resulting solution to about an equivalent amount of solvent maintained at a temperature sufficient to effect ring closure (usually about 230–270° C.). As the cyclization reaction proceeds, the alcohol formed in the reaction is desirably permitted to distill from the reaction mixture and heating is preferably continued until the distillation of alcohol ceases. Thereafter, the reaction mixture may be cooled and the cyclized product (XI) separated from the solvent.

The process of the present invention may be illustrated by the following specific example describing the preparation of 7-chloro-4-hydroxy-quinoline. It should be clearly understood, however, that this example is merely illustrative of the principles involved and is not intended to delineate the scope of the invention or restrict the ambit of the appended claims; for the process may be applied to a large number of compounds of the type (IX) or (X) including, inter alia, those where Y is hydrogen or one or more halo-(chloro, bromo, iodo, fluoro); dialkylamino; hydroxy; alkyl (e. g., methyl ethyl, etc.); haloalkyl; carbalkoxy (e. g., carbethoxy); or alkoxy (e. g., methoxy, ethoxy, etc.) radicals or the like, or various combinations of such radicals.

EXAMPLE

*Preparation of 7-chloro-4-hydroxyquinoline*

The starting material was obtained by the condensation of one mole of m-chloraniline with one mole of the methyl ester of formylacetic acid. Ten grams of this product (XIV) was dissolved in 100 to 150 cc. of diphenyl ether (Note 1) at a temperature of 120–125° C. This solution was added through a dropping funnel down a Pyrex air condenser, into 100 cc. of vigorously refluxing diphenyl ether. Fifteen to twenty minutes were required for this operation. The mixture was then refluxed for an additional thirty to sixty minutes until the ethanol ceased to distill out the top of the condenser. A solid material formed within forty to sixty minutes after the initial addition of the anil (Note 2).

The mixture was cooled to room temperature and filtered. The solid material was washed thoroughly with petroleum ether (90–110° C.). This crude material was purified by recrystallization from water to yield 4-hydroxy-7-chloroquinoline. A small amount of the desired product was also obtained from the diphenyl ether solution by extraction with boiling water or dilute sodium hydroxide followed by neutralization (Note 3). The yield of crude material was 60 per cent of the theoretical. The yield of the purified product was 40 per cent of the theoretical.

*Notes*

1. "Dowtherm" (a mixture of diphenyl ether and diphenyl) may be used with equally satisfactory results.

2. On one run this product was removed by filtration of the hot (230° C.) solution. This material weighed 0.4 to 0.7 g. and melted at 320–333° C. It may be dissolved in warm dilute sodium hydroxide and reprecipitated by neutralization with dilute hydrochloric acid.

3. A small amount of the product remained in the mother liquor from the recrystallization from water. This may be recovered by evaporation of the water.

We are aware that attempts have heretofore been made to prepare 4-hydroxyquinoline compounds by cyclization of anils or acrylates of the type (IX) or (X). So far as we have been able to determine, however, these attempts have heretofore resulted only in the formation of tarry reaction products and bis-m-chlorophenylurea. (See, for example, Rubstow, J. Gen. Chem. USSR 1, 1885–95 (1937); 9, 1517 (1939)). It is only when the starting materials of this type (IX) or (X) are heated while in dilute solutions that cyclization takes place with the formation of products of the type (XI).

It will be apparent to those skilled in the art that many variations and modifications may be made in the procedure described in the foregoing specific example. It will also be apparent that the principles of the present invention are applicable to a large number of compounds other than those specifically mentioned herein. Indeed, as previously mentioned, the reaction appears to be generally applicable to compounds of the type:

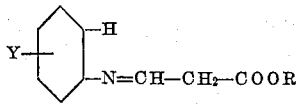

or to their tautomeric or isomeric acrylates of the type:

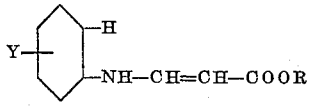

where Y is either hydrogen or one or more nuclear substituents or radicals and R is an alkyl group. All such obvious variations, modifications and extensions of the procedure described in the example are to be understood as embraced within the scope of the invention and of the appended claim.

Having thus described our invention, what we claim as new and wish to secure by Letters Patent is:

In a method of forming a 7-substituted-4-hydroxyquinoline from a compound selected from the group consisting of substituted acrylates and their isomeric anils having the general formulae

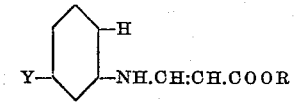

and

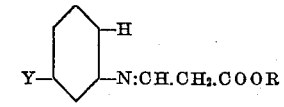

where Y is a nonreactive monovalent radical located in any position other than the ortho-position and R is a lower alkyl radical by heating the compound, while in solution in at least twenty times its weight of an inert solvent having a boiling point of at least 270° C., to a temperature of about 250° C., and under conditions permitting the distillation of an alcohol from the reaction mixture and continuing heating the solution until distillation of alcohol substantially ceases with formation of 7-substituted-4-hydroxyquinoline, the improvements which include separating and recovering the said 7-substituted-4-hydroxyquinoline from the reaction mixture by cooling the said mixture until at least substantial amounts of crude 7-substituted-4-hydroxyquinoline separate from the reaction mixture, filtering the same, washing the filter contents with petroleum ether, recrystallizing the 7-substituted-4-hydroxyquinoline from water to yield pure compound, and treating the filtrate from the filtration for recovering additional quantities of the compound by extracting the filtrate with dilute caustic soda, neutralizing the resulting extract solution, recovering the 7-substituted-4-hydroxyquinoline by filtering the resulting neutralized mixture, dissolving the thus-recovered hydroxyquinoline compound in water, and recrystallizing purified 7-substituted-4-hydroxyquinoline from the resulting aqueous solution.

CHARLES C. PRICE.
ROBERT H. REITSEMA.

REFERENCES CITED

The following references are of record in the file of this patent:

UNITED STATES PATENTS

| Number | Name | Date |
|---|---|---|
| 2,478,125 | Northey et al. | Aug. 2, 1949 |